United States Patent
Von Wechgeln (10) Patent No.: US 6,697,168 B2
(45) Date of Patent: Feb. 24, 2004

(54) METHOD FOR CALIBRATING IMAGE RECORDING EQUIPMENT

(75) Inventor: Jörg Olaf Von Wechgeln, Wattenbek (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 586 days.

(21) Appl. No.: 09/740,650

(22) Filed: Dec. 18, 2000

(65) Prior Publication Data

US 2001/0005270 A1 Jun. 28, 2001

Related U.S. Application Data

(63) Continuation of application No. PCT/DE99/01347, filed on May 4, 1999.

(51) Int. Cl.$^7$ .............................. H04N 1/407; G06T 5/30
(52) U.S. Cl. ...................... 358/1.9; 358/3.02; 358/406; 382/257
(58) Field of Search .............................. 358/1.9, 3.02, 358/3.09, 3.12, 3.23, 504, 406; 382/257; 347/131, 251–254

(56) References Cited

U.S. PATENT DOCUMENTS

| 4,259,694 A | 3/1981 | Liao | 358/3.07 |
|---|---|---|---|
| 4,758,897 A | 7/1988 | Hiratsuka et al. | 358/3.08 |
| 4,945,422 A | 7/1990 | Ng | 358/3.19 |
| 5,357,273 A | * 10/1994 | Curry | 347/131 |
| 5,696,845 A | * 12/1997 | Loce et al. | 358/1.9 |
| 6,275,304 B1 | * 8/2001 | Eschbach et al. | 358/1.9 |

FOREIGN PATENT DOCUMENTS

| DE | 43 03 081 A1 | 8/1993 | |
| DE | 43 03 081 C2 | 9/1993 | |
| EP | 0 528 094 A1 | 2/1993 | |
| EP | 0 734 151 A1 | 9/1996 | H04N/1/405 |
| EP | 0 741 488 A2 | 11/1996 | H04N/1/405 |

* cited by examiner

*Primary Examiner*—Scott Rogers
(74) *Attorney, Agent, or Firm*—Laurence A. Greenberg; Werner H. Stemer; Ralph E. Locher (57) ABSTRACT

A method for calibrating image recording equipment is described. According to the method, raster areas such as images or color prints are recorded pixel by pixel, line by line in the form of screen dots on an image support by use of at least one exposure beam generated in an exposure unit. An image stored as a bit-map image and containing line data (binary image) is divided into fields. A raster percentage is determined for every field by calculating an average. A variation in the raster percentage is determined from a density-exposure curve. The parameters required for the variation are calculated by an algorithm and memorized in a variation table. The most suitable algorithm is read from the variation table and executed and the data determined thereby are memorized.

13 Claims, 5 Drawing Sheets

METHOD FOR CALIBRATING IMAGE RECORDING EQUIPMENT

CROSS-REFERENCE TO RELATED APPLICATION

This is a continuation of copending International Application PCT/DE99/01347, filed May 4, 1999, which designated the United States.

BACKGROUND OF THE INVENTION

FIELD OF THE INVENTION

The present invention relates to the field of electronic image reproduction, and to a method for calibrating image recording equipment in which raster areas, such as images or chromatic components are recorded on a recording medium, for example on film or on a printing plate, pixel-by-pixel, in lines, by use of at least one exposure beam which is produced in an exposure unit.

German Patent DE 43 03 081C describes a method and a device for exposure calibration of recording equipment, in which so-called contone data are recorded by an exposure unit. The term contone data refers to image data with a resolution of, for example, 8 bits and which has been obtained by sampling or scanning half-tone images. The calibration can be carried out in the exposure unit itself or in an upstream raster image processor (RIP) in which the image data are prepared for recording. The purpose of the calibration is to correct the exposure characteristic of the exposure source and the film characteristic, such that the raster points are reproduced in the correct area coverage on exposure. The calibration is no problem with contone image data. If, for example, 50% of the image is blackened, and the aim is also to expose the image with 50% area coverage, a look-up table, which contains the correction values, is produced for linearization. A step wedge is exposed and measured using the image recording equipment in order to produce the look-up table. This confirms what correction values are required in order to produce a specific area coverage on the film. The look-up table is used to vary the drive to the exposure source such that the film is blackened with 50% area coverage. This thus results in linearization that allows the image recording equipment to record the correct tone levels of the image. However, this method does not allow calibration of the recording equipment to be carried out when the recording equipment is actuated using line data, for example using binary data (bit map). The resolution of this bit map corresponds to the resolution of the exposure beam. Line data are image data which have been obtained by sampling or scanning line drawings, text, graphics or raster images, and are stored in the form of a bit map, with the raster points likewise being in the form of line data. However, the linearization process for contone data cannot be applied to such line data, since the contone data would have 8-bit resolution.

Published, European Patent Application EP 0 734 151A1 describes a method for producing a frequency-modulated raster, in which the smallest raster points vary somewhat in size and shape. This minimizes the losses of the printing range in the very bright and very dark tones, which are caused by overexposure during film exposure and by dot growth during printing, and adequately fine graduations of the gray levels are maintained in these tonal-value areas. However, the method is not suitable for tonal-value calibration of a recording appliance that is actuated using line data.

SUMMARY OF THE INVENTION

It is accordingly an object of the invention to provide a method for calibrating image recording equipment that overcomes the above-mentioned disadvantages of the prior art methods of this general type.

The invention is based on the object of specifying a method for calibrating image recording equipment, by which the recording equipment can be calibrated even when the image recording equipment is actuated using line data. A further object of the invention is to be able to carry out gradation corrections in order to correct the image.

With the foregoing and other objects in view there is provided, in accordance with the invention, a method for calibrating image recording equipment on a basis of a previously determined raster percentage value correction function, in which raster areas are recorded in a form of raster points on a recording medium, pixel-by-pixel, in lines by at least one exposure beam produced in an exposure unit. The method includes the steps of splitting an image, which is stored as a bit map and is composed of line data, into fields; averaging each field for determining a raster percentage value; determining a change to the raster percentage value from the raster percentage value correction function; and carrying out the change to the raster percentage value, depending on a change direction, by one of erosion and dilatation of raster points in the field.

In accordance with an added feature of the invention, there are the steps of calculating parameters required for the change in advance and storing the parameters in a change table; and reading the parameters associated with the raster percentage value from the change table.

In accordance with an additional feature of the invention, there is the step of splitting the image into fields of equal size.

In accordance with another feature of the invention, each of the fields covers approximately one raster grid interval.

In accordance with a further feature of the invention, there is the step of using a surrounding area which is larger than a field size for the averaging.

In accordance with another added feature of the invention, there is the step of carrying out operations of the erosion and the dilatation more than once.

In accordance with another additional feature of the invention, there is the step of interchanging the erosion and the dilatation operations after inverting the line data of the image.

In accordance with a further added feature of the invention, there is the step of applying the erosion and the dilatation to duplicated line data in order to increase accuracy.

In accordance with a further additional feature of the invention, there is the step of calculating the change table for the raster percentage value in fixed steps.

In accordance with yet another feature of the invention, an entry in the change table contains at least one parameter selected from raster percentage values, desired changes, duplicating factors, number of erosions, number of dilatations, a type of operation and a result.

In accordance with a further feature of the invention, there is the step of entering a combination of parameters in the change table which gives a best approximation to a desired change.

In accordance with another feature of the invention, there is the step of carrying out an edge treatment when the erosion and the dilatation are carried out.

In accordance with a concomitant feature of the invention, there is the step of returning the line data to an original resolution after carrying out the erosion and the dilatation on duplicated data.

Other features which are considered as characteristic for the invention are set forth in the appended claims.

Although the invention is illustrated and described herein as embodied in a method for calibrating image recording equipment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
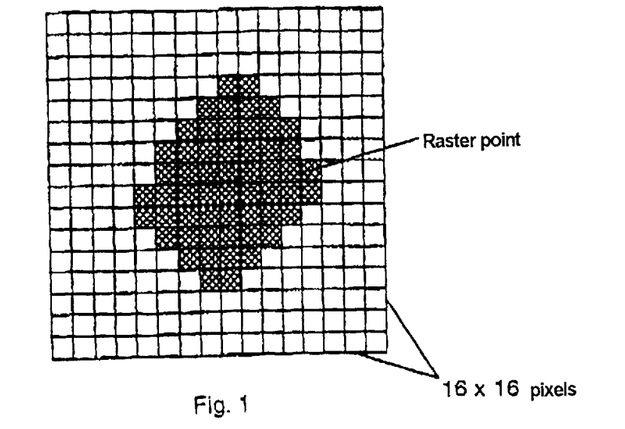
FIG. 1 is a diagrammatic, plotted representation of a raster point.

In all the figures of the drawing, sub-features and integral parts that correspond to one another bear the same reference symbol in each case. Referring now to the figures of the drawing in detail and first, particularly, to FIG. 1 thereof, there is shown a typical raster point that occurs in an image composed of line data which is stored as a bit map. In FIG. 1, the raster point is shown in a field of 16×16 pixels, with the pixels which are intended to be blackened by the recording beam on the film likewise being blackened within the 16×16 field. The method according to the present invention is based on the application, according to the invention, of erosion and dilatation operations to the individual 16×16 fields, as is shown in more detail in FIGS. 2 and 3. Dilatation and erosion are described in the book titled "Methoden der digitalen Bildsignalverarbeitung" [Digital Image Signal Processing Methods] by Piero Zamperoni, 2nd revised edition, 1991, Vieweg Verlag, Brunswick. In order to carry out the erosion process, all the pixels in the 16×16 field in FIG. 1 are occupied with a 3×3 field, and the central pixels of the 3×3 field are deleted if one pixel within the 3×3 field is not blackened. However, to do this, the deletion is not carried out immediately, but only after the entire field has been checked. It can now be seen from FIG. 2 that the remaining raster point is smaller than the original raster point in FIG. 1.

Figure 3:
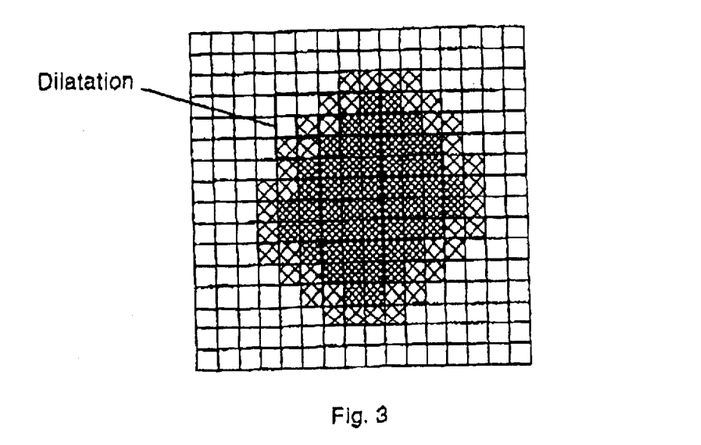
FIG. 3 is a plotted representation of the raster point with a dilatation operation being carried out.

FIG. 3 shows the process of dilatation. This result was likewise obtained with a 3×3 field. However, in the result image, all those pixels are blackened in which one or more of the nine pixels in the surrounding 3×3 field are black. Alternatively, those pixels remain set at white in which all 9 pixels in the surrounding 3×3 field are white.

Erosion provides the same result as dilatation if the image data are inverted before the operation, that is to say blackening in the 16×16 field is changed to white, and the white pixels are changed to black, with the dilatation then being carried out and the data being inverted once again. The same also applies to dilatation and erosion on inverse image data.

These operations can, of course, also be applied to larger fields than 3×3 pixels, but the present analysis was limited to 3×3 fields for simplicity reasons.

The following text explains the effect of erosion and dilatation in the present invention. The field in FIG. 1 has 16×16 pixels, of which 56 pixels are black. This results in an area coverage of 56/256=21. 9%.

Figure 2:
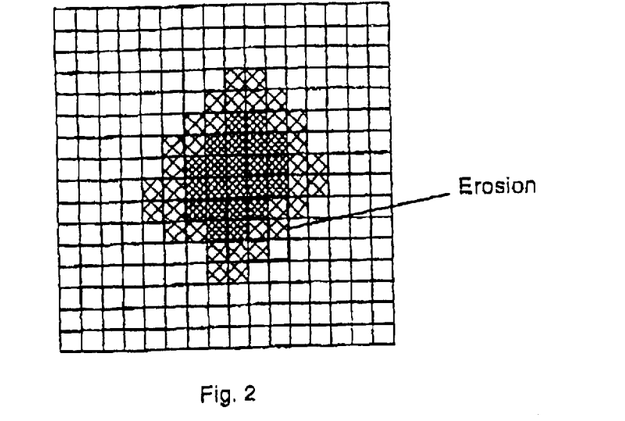
FIG. 2 is a plotted representation of the raster point with an erosion operation being carried out.

Only 22 black pixels remain in FIG. 2. These give an area coverage of 22/256=8. 6%. Erosion has reduced the area coverage by 21.9%−8.6%=13.3%. After the dilatation in FIG. 3, there are 98 black pixels. These give an area coverage of 98/256=38.3%. The dilatation has increased the area coverage by 38.8%−21.9%=16.9%. These values are still too coarse for the present invention. However, the aim of the invention is to achieve an accuracy of ±0.25 raster per cent or better. This is not achieved with the calculation based on the original line data. In order to achieve this higher accuracy, dilatation or erosion is carried out on duplicated line data.

Figure 4:
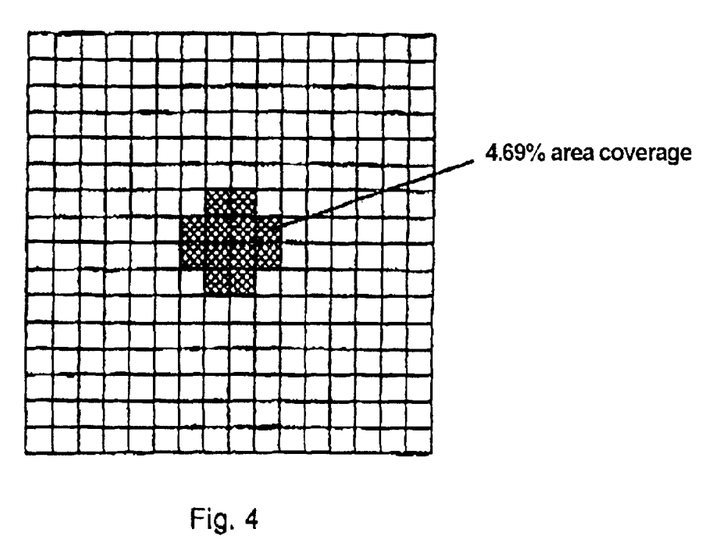
FIG. 4 is a plotted representation of a 16×16 field with 12/256=4. 69% area coverage.

FIG. 4 shows a 16×16 field with 12/245=4.69% area coverage. If the entire 16×16 field is duplicated by a factor of 4, then this results in a field of size (16×4)×(16×4)=64× 64=4096 pixels. The raster point in FIG. 5 has an area coverage of 192/4096=4.69%. The relationships have not been changed by the duplicating process.

Figure 5:
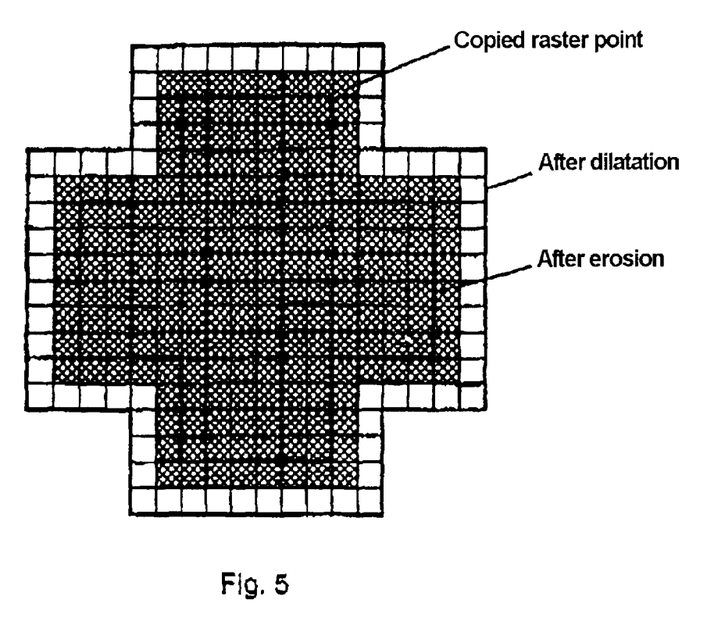
FIG. 5 is a plotted representation of the raster point as in FIG. 4, with quadruple duplicating and the result of erosion and dilatation.

After the erosion process in FIG. 5, only 132 black pixels still remain. This gives an area coverage of 132/4096= 3.22%. As a result of the erosion process, the area coverage has been reduced by 4.69%−3.22%=1.47%. After the dilatation in FIG. 5, there are 260 black pixels. These give an area coverage of 260/4096=6.35%. The dilatation process has resulted in the area coverage being increased by 6.35%− 4.69%=1.66%. The magnitude of the change can be reduced even further by using a higher duplicating factor.

Figure 6:
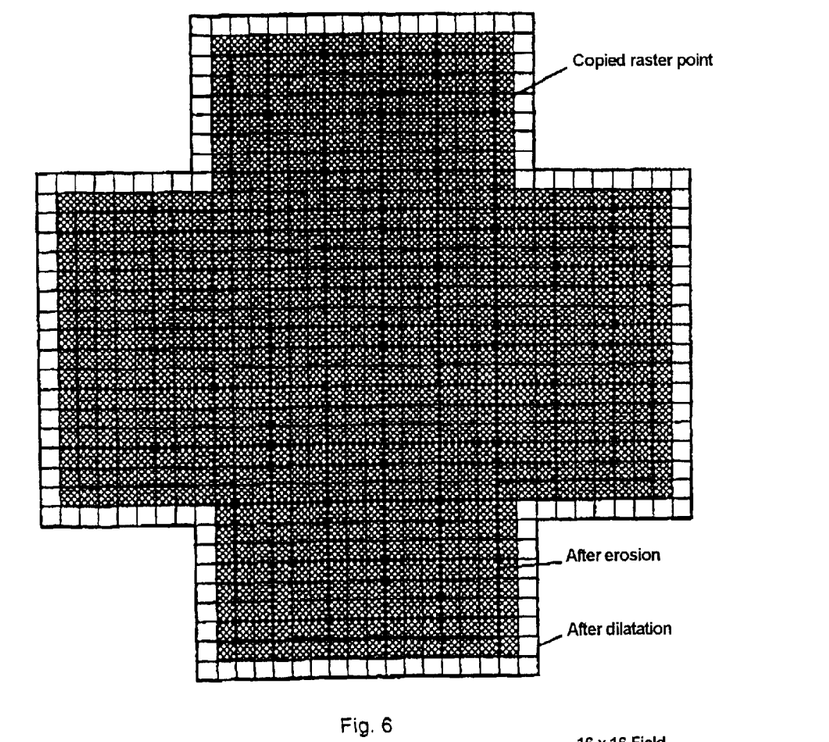
FIG. 6 is a plotted representation of the raster point as in FIG. 4, with 8-times duplicating and the result of erosion and dilatation.

FIG. 6 shows the same raster point as in FIG. 4, duplicated 8 times. The 16×16 field then has a size of (16×8)×(16×8)= 128×128=16384 pixels. The original dot has an area coverage of 758/16384=4.69%.

After erosion, the area coverage is 644/16384=3.93% (change: −0.76%). After dilatation, the coverage is 900/ 16384=5.49% (change: +0.80%).

In order to use the method according to the invention now, the image which is stored as a bit map and is composed of line data (binary image)-is split into fields of equal size. Each of the fields covers approximately one raster grid interval. A raster of 64 l/cm or 160 dpi has a raster grid interval of about 156 μm. If the line data now have a resolution of 1000 l/cm (10. 0 μm dot size), then the field size is 16×16 pixels.

A raster percentage value is determined for each field, by averaging. A larger surrounding area than the field size is required for this purpose. The raster percentage value is calculated from the mean value of 3×3 fields of size 16×16 pixels, or 5×5 fields of size 16×16 fields.

An exposure correction or gradation curve is then used to determine how the appropriate raster point is to be changed.

The parameters required for this change are calculated, and are stored in a change table.

The image is now processed in fields. There must be 3–5 fields in the memory. The edge pixels at the edge of the image are duplicated or ignored. The following steps are carried out for each field:

a) the raster percentage value is determined by averaging,
b) the change for the raster percentage value is determined from the gradation curve,
c) the algorithm providing the best match is read from the change table,
d) the algorithm is carried out,
e) the data are duplicated using the factor from the change table,
f) the dilatation or erosion is carried out n-times,
g) the data are combined, and
h) the data are stored.

A simplified model, with "virtually square raster points" can be used to allow the percentage change to be calculated. With a 16×16 field, the change for a 5% raster point is calculated for 3 different duplicating factors. It is likewise shown that the dilatation and erosion can also be carried out more than once, successively. A virtually square raster point of a specific size, for example 14×15 pixels, makes it easy to calculate the result of the erosion by subtraction of the edge lengths by the factor 2 in the example 12×13 pixels. The result of the dilatation can be predicted by addition of the edge lengths using the factor 2 in the example 16×16 pixels. This is shown in the following text, using a number of examples.

16×16 field with duplicating by a factor of 4:

The duplicating factor of 4 gives a field of (16×4)×(16×4)=64×64=4096 pixels. 4096 pixels×5.0% gives 204.8 pixels.

The square root of this gives an edge length of 14.3 pixels. There are two possible ways to obtain the dot approximately: With a raster point whose size is 14×14 or 14×15 pixels 14×14/4096=4.79% 14×15/4096=5.13%

The raster point with the size of 14×15 pixels is closer to the nominal value of 5.0%.

Modified original dot: 14×15/4096=5.13%

1×erosion with 3×3 field: 12×13/4096 3.81% (change: −1.32%).

1×dilatation with 3×3 field: 16×17/4096=6.64% (change: +1.51%).

16×16 field with duplicating by a factor of 8:

The duplicating factor of 8 gives a field of (16×8)×(16×8)=128×128=16384 pixels. 16384 pixels×5.0% gives 819.2 pixels.

The square root of 819.2 gives an edge length of 28.6 pixels. 28×29/16384=4.96% 29×29/16384=5.13%

The raster point with a size of 28×29 pixels is closer to the nominal value of 5.0%.

Modified original dot: 28×29/16384=4.96%

1×erosion with 3×3 field: 26×27/16384=4.28% (change: −0.68%).

1 dilatation with 3×3 field: 30×31/16384=5.68% (change: +0.72%).

16×16 field with duplicating by a factor of 20:

The duplicating factor of 20 gives a field of (16×20)×(16×20)=320×320=102400 pixels.

102400 pixels×5.0% gives 5120 pixels.

The square root of 5120 gives an edge length of 71.6 pixels. 71×72/102400=4.99% 72×72/102400=5.06%.

The raster point with the size of 71×72 pixels is closer to the nominal value of 5.0%.

Modified original dot: 71×72/102400=4.99%

1×erosion with 3×3 field: 69×70/102400=4.72% (change: −0.27%)

2×erosion with 3×3 field: 67×68/102400=4.45% (change: −0.54%)

3×erosion with 3×3 field: 65×66/102400=4.19% (change: −0.80%)

1×dilatation with 3×3 field: 73×74/102400=5.28% (change: +0.29%)

2×dilatation with 3×3 field: 75×76/102400=5.57% (change+0.58%)

3×dilatation with 3×3 field: 77×78/102400=5.87% (change: +0.88%)

If the duplicating factors are high, then a fine gradation with high accuracy can be achieved with a number of dilatations and erosions.

In addition, it should be noted that the changes to for example 5.0% are identical to the changes to 95.0%. All that is needed for this is to invert the data, and to replace the dilatation by erosion.

The actual correction is carried out using a change table. The calculation of the change table is explained as explained in the following text. The field size is determined before the change tables are calculated. This field size is governed by the size of the raster grid interval and by the resolution of the line data.

Line data resolution/raster=field size (rounded).

For example: 1000 l/cm/64 l/cm=15. 6, that is to say a field of size 16×16.

A change table is calculated in fixed steps for the raster percentage values from 1.0% to 99.0%. The desired change for each raster percentage value is entered in the change table from the exposure correction curve or gradation curve. If the raster grid interval does not correspond exactly to 16×16 pixels, then this percentage error can be taken into account when calculating the change table.

The following parameters are associated with each table entry:

a) raster percentage value,
b) desired change,
c) duplicating factor,
d) number of dilatations or erosions,
e) algorithm (dilatation or erosion),
f) result.

The list below shows a number of examples from a change table:

| Raster %: | 5.0% | 9.0% | 23.0% | 52.0% | 87.0% |
|---|---|---|---|---|---|
| Weighted change: | +1.5% | −3.5% | +2.5% | −2.0% | −1.5% |

-continued

| Factor: | 12 | 6 | 10 | 18 | 6 |
|---|---|---|---|---|---|
| Number: | 3 | 3 | 2 | 2 | 1 |
| Algorithm: | Dilat. | Eros. | Dilat. | Eros. | Eros. |
| Result: | +1.49% | −3.39% | +2.45% | −1.98% | −1.54% |

The duplicating factors are calculated from 1 to a maximum of 50 in order to determine the change values. In the process, the number of dilatations or erosions is varied between 1 and 5. The data for the combination of factor, erosion, dilatation and number as well as result which give the best match are entered in the table.

It is possible to activate a terminate condition when the accuracy is achieved. It should be remembered that, as the duplicating factor increases, the computation complexity likewise rises sharply, and optimization between accuracy and computation complexity is thus worthwhile.

Figure 7:
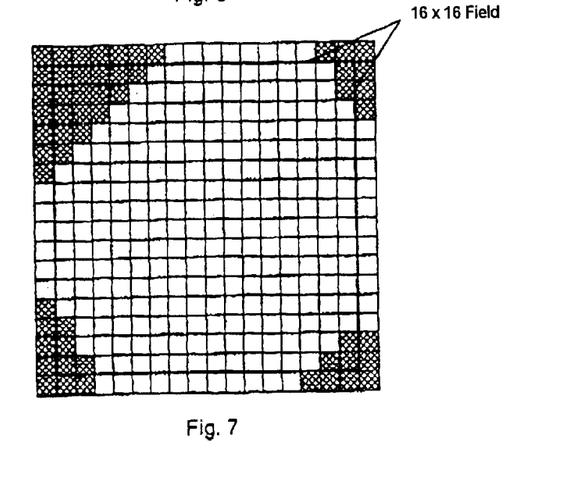
FIG. 7 is a plotted representation of a possible position of a 16×16 field, with the overlap from an adjacent dot.

An edge treatment is carried out when carrying our the dilatation and erosion at the edge of the fields. The invention is based on the fact that a raster grid interval need not be matched exactly. A fixed field size is used within an image. It is thus possible for the contents of a field to appear as in FIG. 7. In this case, it is important to produce a smooth transition between the fields.

Figure 8:
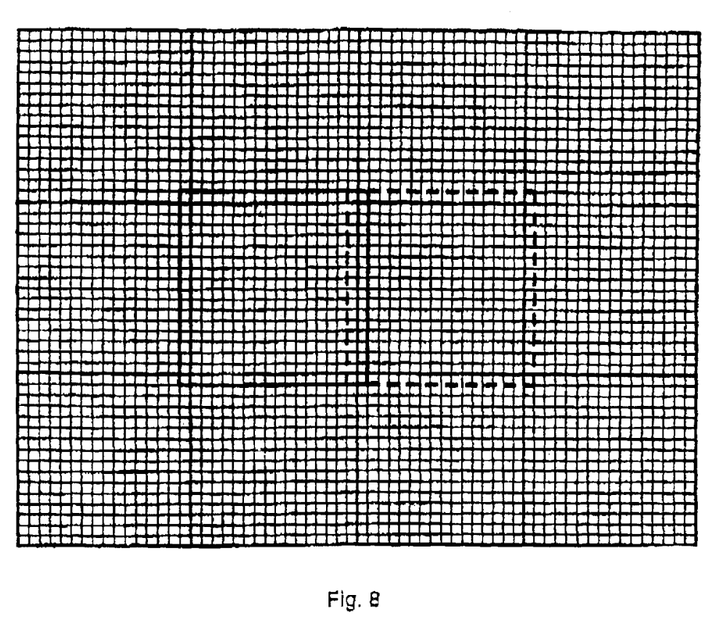
FIG. 8 is an illustration of an example of 16×16 fields with the overlap from one dot.

Dilatation and erosion are carried out on 3×3 pixels. The pixels result always relates to the center of the 3×3 pixels. It is therefore important that there is always one edge dot available for dilatation or erosion in the 16×16 field. The data from an 18×18 field are therefore required for a 16×16 field. If the data are duplicated by a factor of 4, than 4 erosions or dilatations can be carried out without errors occurring at the transitions. Data from a 20×20 field must then be used for 5 erosions or dilatations. The enlarged fields of 18×18 and 20×20 pixels described here represent overlapping areas, with the actual field size of 16×16 being maintained. This is shown in FIG. 8 using an example of 16×16 fields with an overlap of one point.

Since the dilatations or erosions have been carried out on duplicated data, it is necessary to return from the duplicated data to the original data. The pixels of a copying grid interval are added for this purpose. The threshold of half the grid interval size is applied to this sum data. Duplicating by a factor of 4 gives, for example, 4×4=16 pixels per grid interval.

Threshold=grid interval size/2=8.

Figure 9:
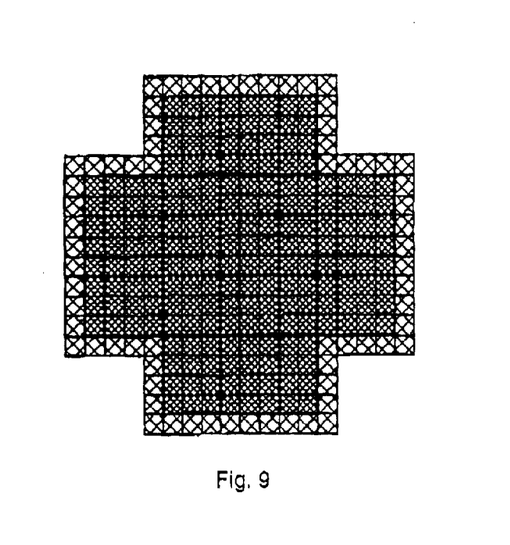
FIG. 9 is a plotted representation of the raster point enlarged by a factor of 4, with the result of dilatation.

FIG. 9 shows a raster point enlarged by a factor of 4. This is enlarged by dilatation.

Figure 10:
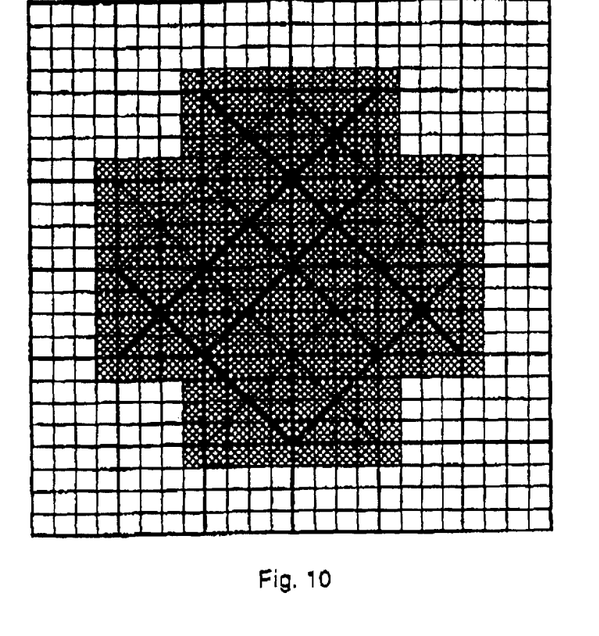
FIG. 10 is a plotted representation of the result of a combination when the grid interval structure is made identical to the duplicating structure.

FIG. 10 shows the result of the combination process when the grid interval structure is made identical to the duplicating structure. This does not result in any change in the result. The grid intervals with the cross become black after the combination process and the others become white.

Figure 11:
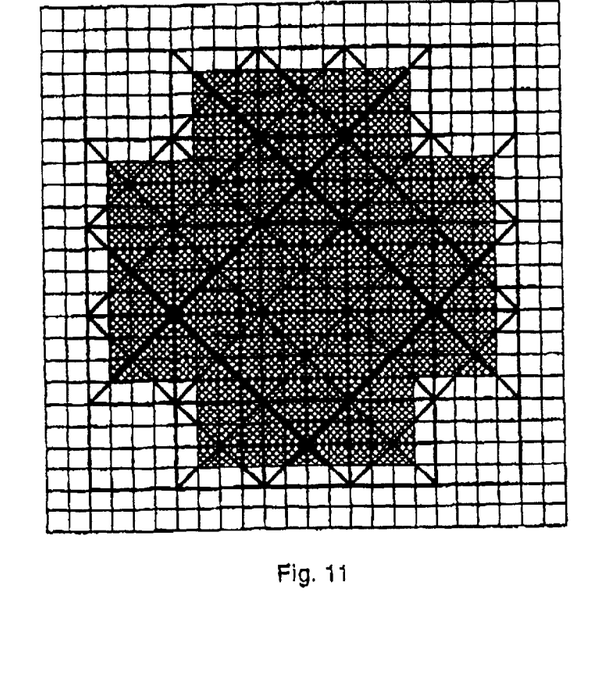
FIG. 11 is a plotted representation of the result of a combination when the grid interval structure is offset by 0. 5 original pixels in both directions.

FIG. 11 shows the result of the combination process when the grid interval structure is offset through 0.5 original pixels in both directions. In practice, line data are scanned data.

These data are not as regular as the images in the example. For this reason, errors are averaged out when the duplicated data are combined. Various geometry offsets can be used in the combination process:

1. no offset
2. a fixed offset of 0.5 original pixels
3. a random offset (random number) of, for example, 0.00 to 0.5 original pixels.

I claim:

1. A method for calibrating image recording equipment on a basis of a previously determined raster percentage value correction function, in which raster areas are recorded in a form of raster points on a recording medium, pixel-by-pixel, in lines by at least one exposure beam produced in an exposure unit, which comprises the steps of:

splitting an image, which is stored as a bit map and is composed of line data, into fields;

averaging each field for determining a raster percentage value;

determining a change to the raster percentage value from the raster percentage value correction function; and carrying out the change to the raster percentage value, depending on a change direction, by one of erosion and dilatation of raster points in the field.

2. The method according to claim 1, which comprises:

calculating parameters required for the change in advance and storing the parameters in a change table; and reading the parameters associated with the raster percentage value from the change table.

3. The method according to claim 1, which comprises splitting the image into fields of equal size.

4. The method according to claim 1, wherein each of the fields covers approximately one raster grid interval.

5. The method according to claim 1, which comprises using a surrounding area which is larger than a field size for the averaging.

6. The method according to claim 1, which comprises carrying out operations of the erosion and the dilatation more than once.

7. The method according to claim 1, which comprises interchanging the erosion and the dilatation operations after inverting the line data of the image.

8. The method according to claim 1, which comprises applying the erosion and the dilatation to duplicated line data in order to increase accuracy.

9. The method according to claim 2, which comprises calculating the change table for the raster percentage value in fixed steps.

10. The method according to claim 2, wherein an entry in the change table contains at least one parameter selected from the group consisting of raster percentage values, desired changes, duplicating factors, number of erosions, number of dilatations, a type of operation and a result.

11. The method according to claim 1, which comprises entering a combination of parameters in the change table which gives a best approximation to a desired change.

12. The method according to claim 1, which comprises carrying out an edge treatment when the erosion and the dilatation are carried out.

13. The method according to claim 1, which comprises returning the line data to an original resolution after carrying out the erosion and the dilatation on duplicated data.

* * * * *

UNITED STATES PATENT AND TRADEMARK OFFICE
CERTIFICATE OF CORRECTION

PATENT NO. : 6,697,168 B2  Page 1 of 1
DATED : February 24, 2004
INVENTOR(S) : Jörg Olaf von Wechgeln It is certified that error appears in the above-identified patent and that said Letters Patent is hereby corrected as shown below:

<u>Title page</u>,
Item [30], Foreign Application Priority Data, should read as follows:
-- Jun. 18, 1998   [DE]         ............ 198 26 986 --

Signed and Sealed this

Twenty-seventh Day of April, 2004

JON W. DUDAS
*Acting Director of the United States Patent and Trademark Office*